United States Patent
Sane et al.

(10) Patent No.: US 7,380,114 B2
(45) Date of Patent: May 27, 2008

(54) INTEGRATED CIRCUIT WITH DMA MODULE FOR LOADING PORTIONS OF CODE TO A CODE MEMORY FOR EXECUTION BY A HOST PROCESSOR THAT CONTROLS A VIDEO DECODER

(75) Inventors: Aniruddha Sane, Bangalore (IN); Manoj Kumar Vajhallya, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 332 days.

(21) Appl. No.: 10/411,632

(22) Filed: Apr. 11, 2003

(65) Prior Publication Data

US 2004/0098577 A1 May 20, 2004

Related U.S. Application Data

(60) Provisional application No. 60/426,583, filed on Nov. 15, 2002.

(51) Int. Cl.
*G06F 9/00* (2006.01)
(52) U.S. Cl. ............................. 713/2; 713/100; 710/22
(58) Field of Classification Search .................. 713/1, 713/2, 100; 710/22, 23
See application file for complete search history.

(56) References Cited

U.S. PATENT DOCUMENTS

| | | | | |
|---|---|---|---|---|
| 5,765,025 A | * | 6/1998 | Morimoto et al. | 710/23 |
| 5,826,108 A | * | 10/1998 | Sonobe | 710/35 |
| 6,035,380 A | * | 3/2000 | Shelton et al. | 711/163 |
| 6,216,217 B1 | * | 4/2001 | Seki | 712/33 |
| 6,323,868 B1 | * | 11/2001 | Paluch et al. | 345/572 |
| 6,708,266 B2 | * | 3/2004 | Suetake | 712/207 |
| 6,725,336 B2 | * | 4/2004 | Cherabuddi | 711/129 |
| 6,954,804 B2 | * | 10/2005 | Lam et al. | 710/14 |

* cited by examiner

*Primary Examiner*—Rehana Perveen
*Assistant Examiner*—Paul Yanchus
(74) *Attorney, Agent, or Firm*—McAndrews, Held & Malloy, Ltd.

(57) ABSTRACT

A system, method, and apparatus for dynamically booting processor code memory with a wait instruction is presented herein. A wait instruction precedes the transfer of a new code portion to the code memory. The wait instruction causes the processor to temporarily cease using the code memory. When the processor ceases using the code memory, the processor signals a direct memory access (DMA) module to transfer a new code portion to the code memory. The DMA module transfers the new code portion to the code memory and transmits a signal to the processor when the transfer is completed. The signal causes the processor to resume. When the processor resumes, the processor begins executing the instructions at the next code address.

2 Claims, 6 Drawing Sheets

INTEGRATED CIRCUIT WITH DMA MODULE FOR LOADING PORTIONS OF CODE TO A CODE MEMORY FOR EXECUTION BY A HOST PROCESSOR THAT CONTROLS A VIDEO DECODER

RELATED APPLICATIONS

This application claims the priority to U.S. Provisional Application for Patent Ser. No. 60/426,583, "Dynamic Booting of Processor Code Memory using Special Wait Instruction", 14144US01, filed Nov. 15, 2002, by Sane, et. al.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

As applications of embedded processors become more complex, the size of code for such applications is increasing, thereby increasing the size of processor code memory. However, increasing the size of the processor code memory is expensive and is also an inefficient use of chip real estate.

Some processors solve this problem by using a cache in place of the code memory. The cache stores only a portion of the code for an application at any given time. When the code address points to a code that is not in the cache at any particular point of time, a cache miss occurs. When a cache miss occurs, the new code is fetched into the code memory from system memory (such as DRAM). The new code replaces some of the existing and in most cases, the Least Recently Used (LRU) code.

Caching portions of the application code is expensive because special hardware is required for detecting cache misses, for translating cache misses into correct system memory accesses, and for deciding which code to replace.

Another possible solution would be to keep the processor under reset during the time new code is loaded into the code memory. However, resetting the processor erases all the information stored in the general purpose registers within the processor. Accordingly, a swap routine is used to copy the registers to the DRAM prior to a reset. The foregoing is disadvantageous because the swap routine resides in and consumes a significant amount of the code memory. In addition to the code space, time is also spent for swapping.

BRIEF SUMMARY OF THE INVENTION

The present invention is directed to dynamically booting processor code memory using a special wait instruction. A wait instruction precedes the transfer of a new code portion to the code memory. The wait instruction causes the processor to temporarily cease using the code memory. When the processor ceases using the code memory, the processor signals a direct memory access (DMA) module to transfer a new code portion to the code memory. The DMA module transfers the new code portion to the code memory and transmits a signal to the processor when the transfer is completed. The signal causes the processor to resume. When the processor resumes, the processor begins executing the instructions at the next code address.

The present invention is also directed to a scheme for executing a program wherein the processor executes a portion of the program. When a portion of code that is not currently in the code memory is required, the processor instructs the DMA to fetch the necessary code from the system memory and then executes a wait instruction. Execution of the wait instruction causes the processor to cease execution of the program until the next portion is retrieved and provided to the processor.

These and other advantages and novel features of the present invention, as well as details of illustrated embodiments thereof, will be more fully understood from the following description and drawings.

DETAILED DESCRIPTION OF THE INVENTION

Figure 1:
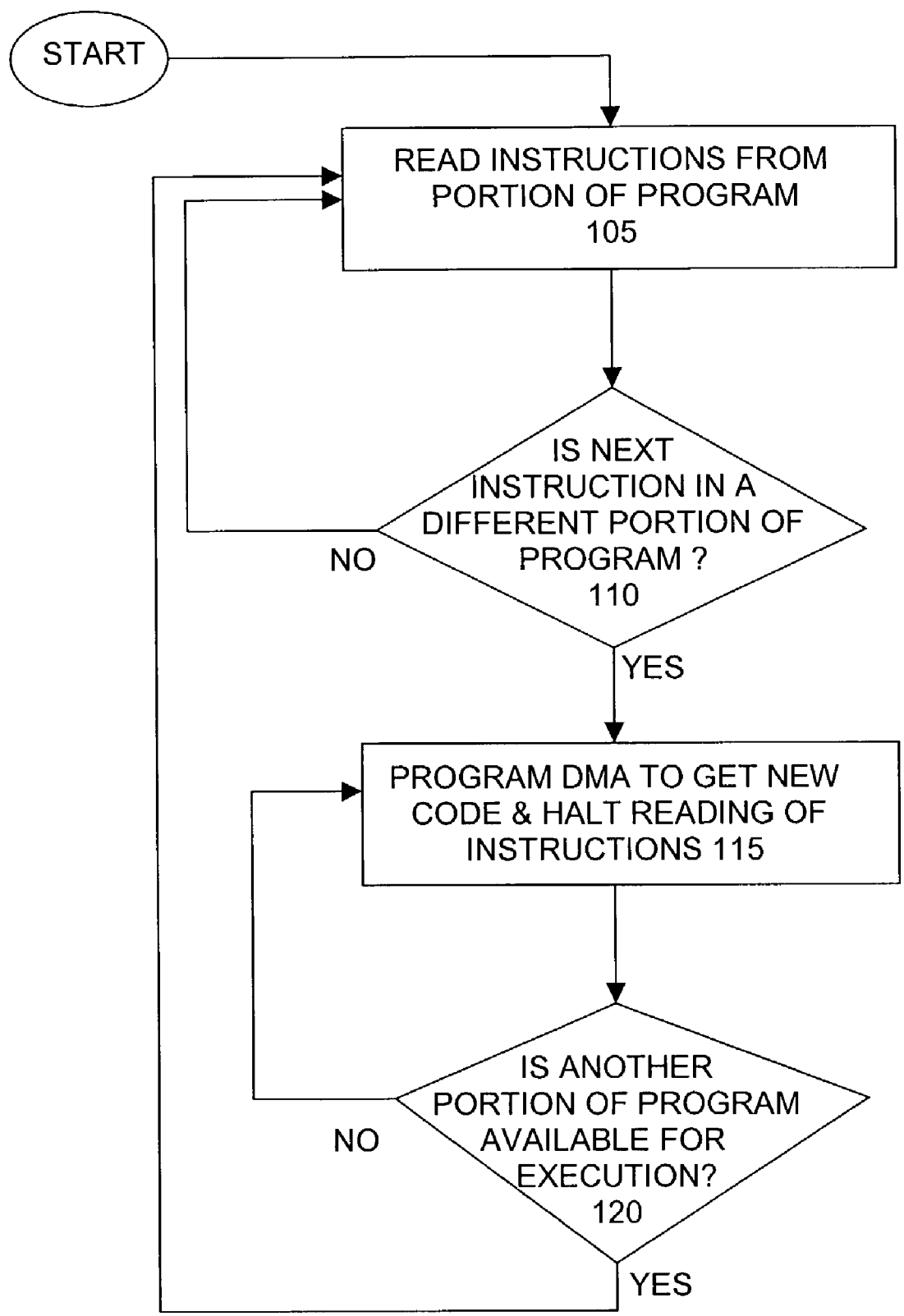
FIG. 1 is a flow diagram for executing a program in accordance with an embodiment of the present invention.

Referring now to FIG. 1, there is illustrated a flow diagram for executing a program in accordance with an embodiment of the present invention. The program is a sequence of instructions that can be divided into two or more portions. Initially, the first portion of the program is available for execution.

Execution of the program is commenced at 105 by reading instructions from the first portion of the program until the next potion of the program (not present in the code memory) is required. When the next portion of the program to be executed is not in the code memory, processor instructs the DMA to fetch that portion and a WAIT instruction is executed at 115 which halts reading of instructions in the program until the another portion of the program is available for execution at 120. When the another portion of the program is available for execution at 120, the processor begins executing the another portion of the program by repeating 105-120.

Figure 2:
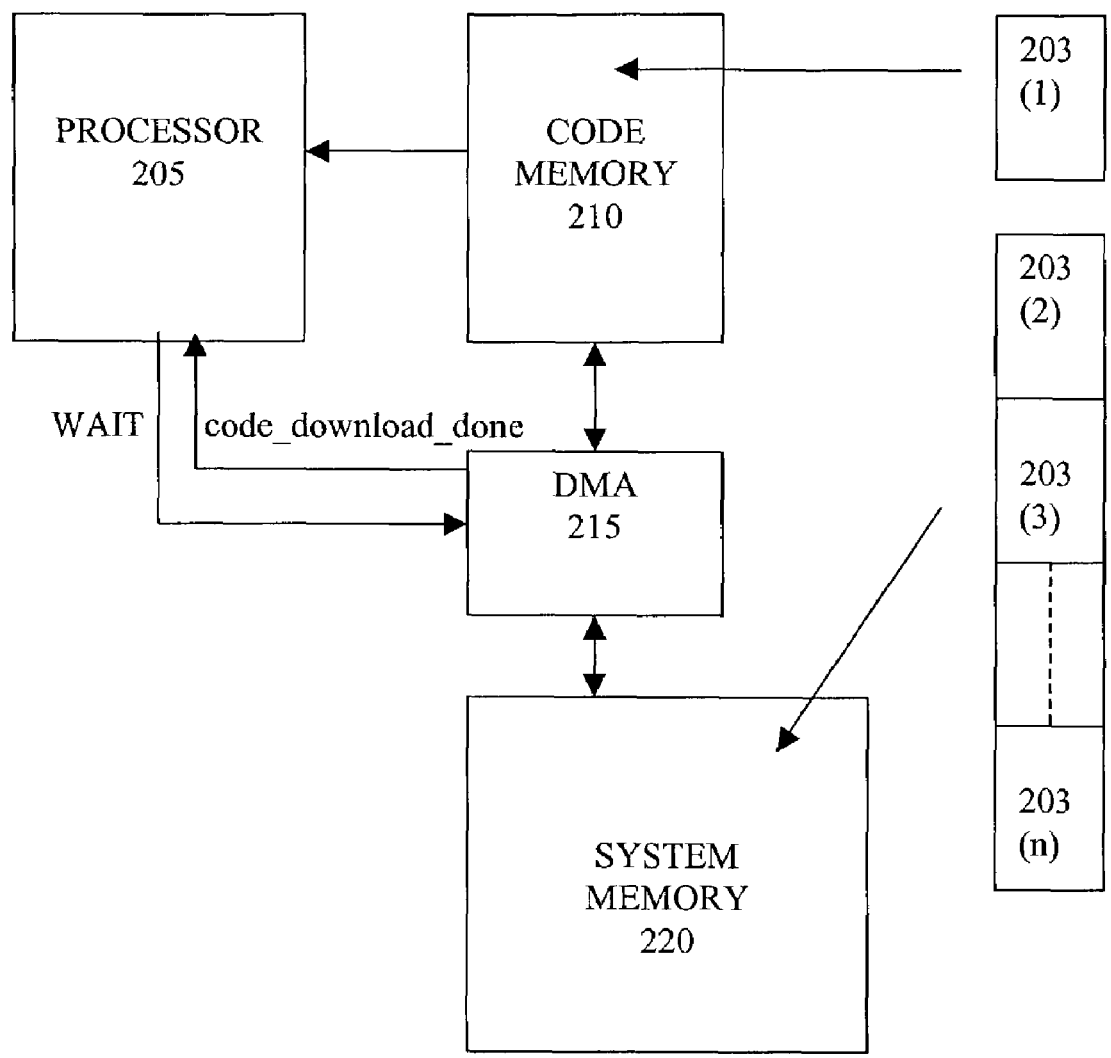
FIG. 2 is a block diagram of an exemplary circuit in accordance with an embodiment of the present invention.

Referring now to FIG. 2, there is illustrated a block diagram of an exemplary circuit for executing a program 203 in accordance with an embodiment of the present invention. The circuit comprises a processor 205 for instructions, a code memory 210 for storing instructions, a direct memory access (DMA) module 215 for loading the code memory 210 with instructions, and a system memory 220 for the program.

The processor 205 executes individual instructions stored in the code memory 210. The program 203 comprises a stream of instructions. As programs become increasingly complex, the number of instructions increases. In many cases, the size of the program 203 exceeds the size of the code memory 210. Therefore, the program 203 is divided into two or more portions 203(1) . . . 203(n), wherein each portion 203(1) . . . 203(n) can be stored in the code memory 210. Accordingly, one portion of the program 203(1) . . . 203(n) can be stored in the code memory 210 for execution by the processor 205. When an instruction of the program 203 to be executed by the processor 205 is in another portion 203(1) . . . 203(n) from the portion stored in the code memory 210, the direct memory access module 215 transfers the another portion from the system memory 220.

The direct memory access module 215 can load the code memory 210 with the another portion 203(1) . . . 203(n), during a time when the processor 205 is not reading from the code memory 210. When the instruction of the program 203 to be executed by the processor 205 is in another portion 203(1) . . . 203(n), the processor 205 can execute a WAIT instruction which causes the processor 205 to access instructions in the code memory 210 until the direct memory access module 215 loads the code memory 210 with the another portion 203(1) . . . 203(n). Before executing the WAIT instruction, the processor executes a set of instructions that tell the DMA module which code needs to be fetched from the DRAM. When the direct memory access module 215 loads the code memory 210 with the another portion 203(1) . . . 203(n), the processor 205 accesses instructions in the another portion 203(1) . . . 203(n) of the program.

When the processor 205 executes the wait instruction, the processor 205 signals the direct memory access module 215 by transmitting a "waiting" signal over a link WAIT connecting the processor 205 to the direct memory access module 215. Responsive thereto, the direct memory access module 215, the direct memory access module begins loading the code memory 210 with the another portion 203(1) . . . 203(n) of the program 203.

After loading the code memory 210 with the another portion 203(1) . . . 203 (n), the direct memory access module 215 transmits a code_download_done signal over a link, code_download_done, connecting the direct memory access module 215 to the processor. Upon receiving the code_download_done signal over the link, code_download_done, the processor 205 resumes executing the instructions in the code memory 210, now storing instructions from the another portion 203(1) . . . 203(n).

Figure 3:
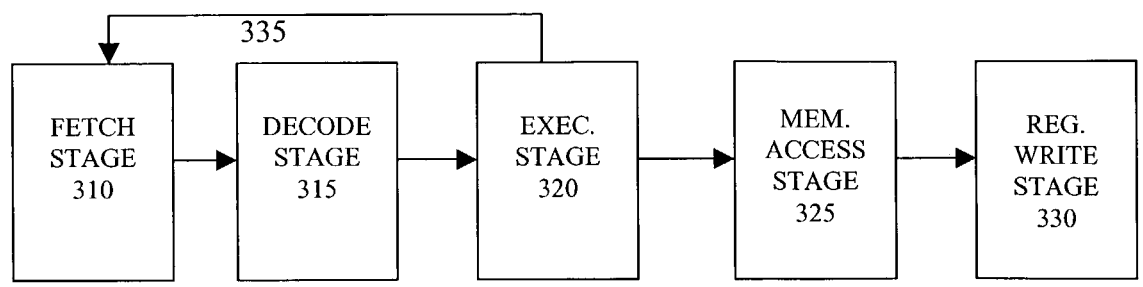
FIG. 3 is a block diagram of an exemplary processor in accordance with an embodiment of the present invention.

Referring now to FIG. 3, there is illustrated a block diagram of an exemplary processor 205 in accordance with an embodiment of the present invention. The processor 205 comprises a pipeline for executing instructions stored in the code memory 210. The processor 205 executes a sequence of individual instructions stored in the code memory 210. Execution of the instructions typically involves multiple phases. For example, in a Reduced Instruction Set Computing (RISC) architecture, execution of instructions involves a fetch, decode, execution, memory access, and register write phase, each consuming a separate clock cycle.

Although each instruction can take as many as five clock cycles to execute, many RISC processors execute close to one instruction every clock cycle by using a pipeline architecture. The pipeline typically comprises a fetch stage 310 for the fetch phase, a decode stage 315 for the decode phase, an execution stage 320 for execution phase, a memory access stage 325 for the memory access phase, and a register write stage 330 for the register write phase. Each of the foregoing can perform their associated function for an instruction in one clock cycle.

By separating the stages, each stage can perform the associated function for a different instruction, thus allowing the fetch stage 310 to fetch instruction, n+4, while the decode stage 315 decodes instruction, n+3, the execution stage 320 executes/calculates an address for instruction n+2, the memory access stage 325 access data memory for instruction n+1, and the register write stage 330 writes to a register for instruction n. At the next clock cycle, the fetch stage 310 can fetch instruction n+5, while the decode stage 315 decodes instruction n+4, the execution stage 320 operates on instruction n+3, the memory access stage operates on instruction n+2, and the register write stage 330 operates on instruction n+1.

As noted above, one portion of a program 203(1) . . . 203(n) can be stored in the code memory 210 for execution by the processor 205. When an instruction of the program 203 to be executed by the processor 205 is in another portion 203(1) . . . 203(n) from the portion stored in the code memory 210, the processor 205 can program the DMA to get the required portion of the code from DRAM and execute a WAIT instruction.

The WAIT instruction is fetched by the fetch stage 310, and decoded by the decode stage 315. After the WAIT instruction is decoded by the decode stage 315, the WAIT instruction is executed by the execution stage 320. The execution stage 320 executes the WAIT instruction by sending a signal to the fetch stage 310 via connection 335 commanding the fetch stage 310 to halt fetching instructions from the code memory 210 for the duration of the signal.

After the execution stage 320 transmits the signal halting the fetch stage 310, the execution stage 320 signals the direct memory access module 215 by transmitting a waiting signal over a link WAIT connecting the processor 205 to the direct memory access module 215. Responsive thereto, the direct memory access module begins loading the code memory 210 with the another portion 203(1) . . . 203(n) of the program 203.

After loading the code memory 210 with the another portion 203(1) . . . 203(n), the direct memory access module 215 transmits a code_download_done signal over a link, code_download_done, to the execution stage 320. Upon receiving the code_download_done signal over the link, code_download_done, the execution stage 320 deasserts the signal over connection 335. When the execution stage 320 deasserts the signal over connection 335, the fetch stage 310 resumes fetching instructions from the code memory 210.

Figure 4:
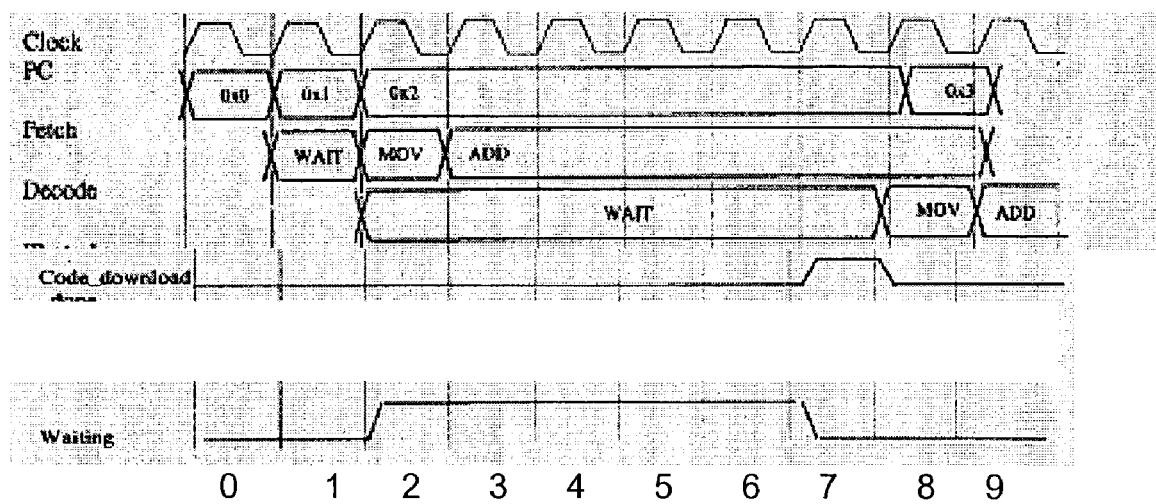
FIG. 4 is a timing diagram describing the operation of the processor in accordance with an embodiment of the present invention.

Referring now to FIG. 4, there is illustrated a timing diagram describing the operation of the processor 205 for an exemplary stream of instructions. The exemplary stream of instructions are as follows:

| Address | Instruction |
|---------|-------------|
| 0x0     | WAIT        |
| 0x1     | MOV         |
| 0x2     | ADD         |

During clock cycle 0, the fetch stage 310 fetches the instruction at address 0x0. At clock cycle 1, the fetch stage 310 passes the instruction at address 0x0 to the decode stage 315 and fetches the instruction at address 0x1. During the clock cycle 1, the decode stage 315 decodes the instruction received from the fetch stage. In the present example, the instruction is WAIT.

During clock cycle 2, the fetch stage 310 fetches the instruction at address 0x2, and passes the instruction at address 0x1 to the decode stage 315. The decode stage 315 passes the WAIT instruction to the execution stage 320 and decodes the instruction received from the fetch stage 310. In the present example, the instruction is MOV. The execution stage 320 executes the WAIT instruction by providing the halt signal to the fetch stage 310 via connection 330 and the signal over the connection, WAIT, connecting the processor 205 to the direct memory access module 215.

Responsive thereto, the direct memory access module begins loading the code memory 210 with the another portion 203(1) . . . 203(n) of the program 203 during cycles 3-6. Additionally, at clock cycle 3, the instructions already in the pipeline can continue to progress. For example, the fetch stage 310 can provide the instruction at address 0×2, ADD, to the decode stage 315 for decoding. The decode stage 315 can latch the instruction stored therein during clock cycle 2, MOV, for the execution stage 320 to be executed after the WAIT instruction is executed.

At clock cycle 7, the code memory 210 is loaded with the another portion 203(1) . . . 203(n) and the direct memory access module 215 transmits a code_download_done signal over a link, code_download_done, to the execution stage 320. Upon receiving the code_download_done signal over the link, code_download_done, the execution stage 320 deasserts the signals over connections WAIT, and 335. At the next cycle, cycle 8, the fetch stage 310 resumes fetching instructions from the code memory 210 at address 0×3. The execution stage 320 executes the instructions that were in the pipeline at the time the WAIT instruction was decoded, e.g., the MOV and ADD instructions, during cycles 8 and 9. After the execution stage 320 executes the instructions that were in the pipeline at the time the WAIT instruction was decoded, the execution stage 320 begins executing instructions from the another portion 203(1) . . . 203(n) of the program 203.

Figure 5:
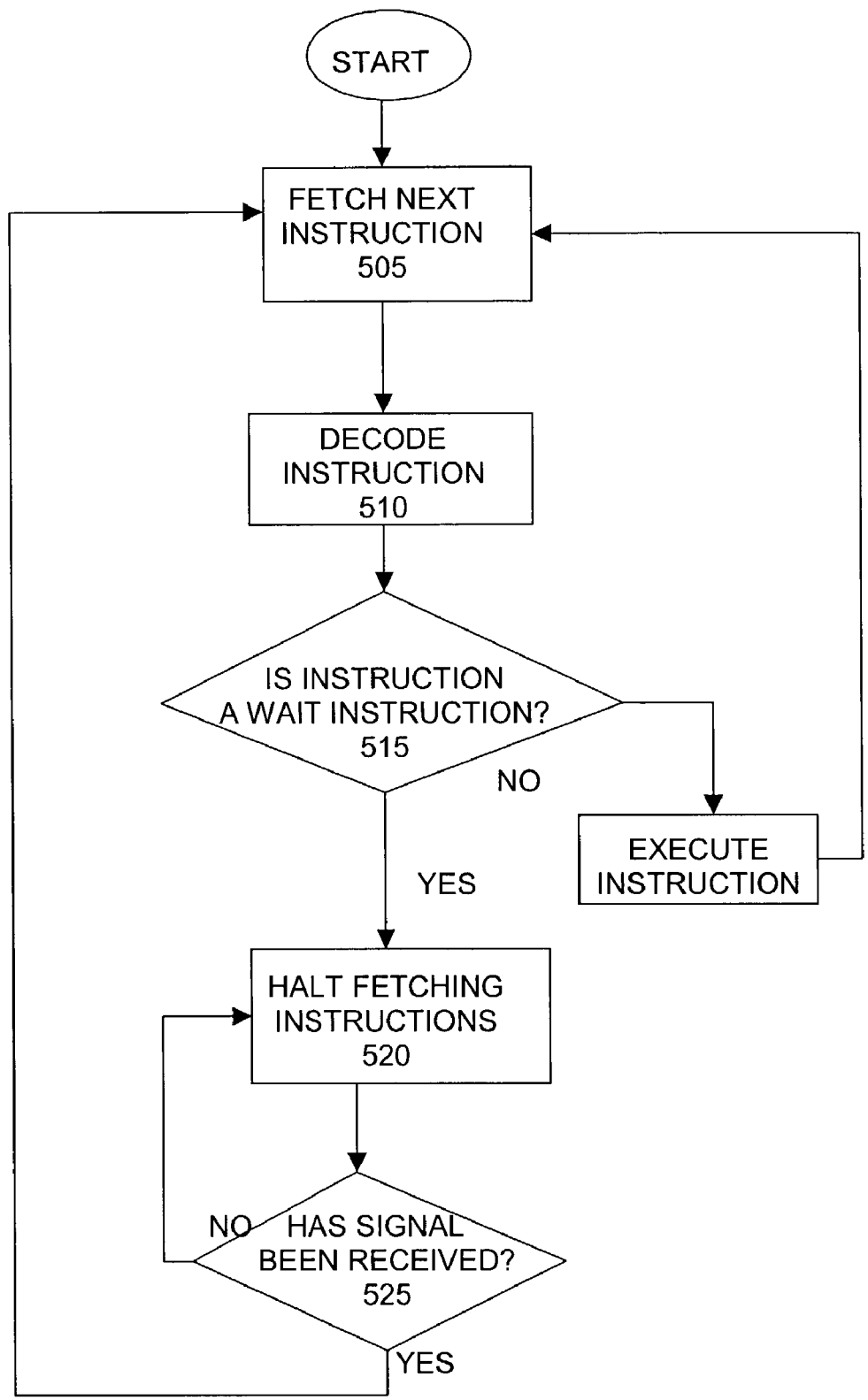
FIG. 5 is a flow diagram describing the operation of the processor in accordance with an embodiment of the present invention.

Referring now to FIG. 5, there is illustrated a block diagram for executing an instruction by the processor 205 in accordance with an embodiment of the present invention. The processor 505 fetches (505) and decodes (510) an instruction. If at 515, the instruction is not a WAIT instruction, the instruction is executed and 505 is repeated.

If at 515, the instruction is a WAIT instruction, the processor 205 halts fetching instructions (520). At 525, the processor 205 signals the direct memory access module 215. The processor 205 then waits until the direct memory access module 215 returns a signal to the processor 205 (525). While the processor 205 is waiting, the direct memory access module 215 can transfer another portion of the program 203 to the code memory 210. When the direct memory access module 215 returns the signal to the processor 205, the processor 205 resumes fetching instructions from the code memory 210, repeating 505.

Figure 6:
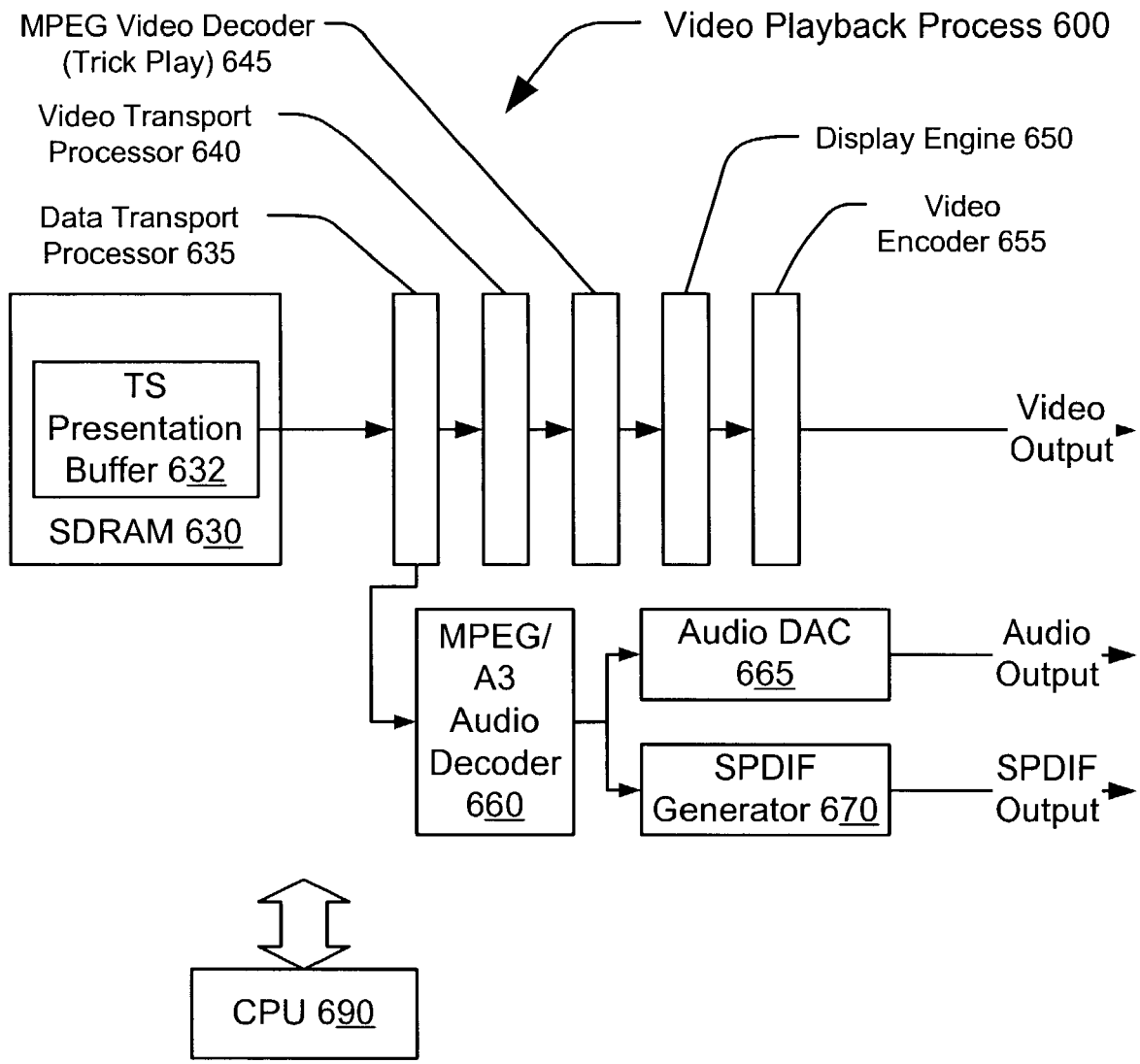
FIG. 6 is an MPEG encoder configured in accordance with an embodiment of the present invention.

Referring now to FIG. 6, there is illustrated a block diagram of a decoder configured in accordance with certain aspects of the present invention. A processor, that may include a CPU 690, reads the MPEG transport stream 230 into a transport stream buffer 632 within an SDRAM 630. The data is output from the transport stream presentation buffer 632 and is then passed to a data transport processor 635. The data transport processor then demultiplexes the MPEG transport stream into it PES constituents and passes the audio transport stream to an audio decoder 660 and the video transport stream to a video transport processor 640 and then to an MPEG video decoder 645 that decodes the video. The audio data is sent to the output blocks and the video is sent to a display engine 650. The display engine 650 is responsible for and operable to scale the video picture, render the graphics, and construct the complete display among other functions. Once the display is ready to be presented, it is passed to a video encoder 655 where it is converted to analog video using an internal digital to analog converter (DAC). The digital audio is converted to analog in the audio digital to analog converter (DAC) 665.

In one embodiment of the invention, various ones of the aforementioned modules, such as the processor 690, the video transport processor 340, audio decoder 660, or MPEG video decoder 645 can comprise a processor configured such as processor 205.

One embodiment of the present invention may be implemented as a board level product, as a single chip, application specific integrated circuit (ASIC), or with varying levels integrated on a single chip with other portions of the system as separate components. The degree of integration of the monitoring system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. An integrated circuit for decoding video data, said integrated circuit comprising:
   a video decoder for decompressing the video data;
   a code memory for storing a portion of a program and a particular instruction, said portion of the program indicating a location of another portion of the program, said program for controlling the video decoder;
   a host processor for controlling the video decoder and for executing the portion of the program, and the particular instruction after the portion of the program; and
   a direct memory access module for loading the code memory with the another portion of the program from the location;
   wherein execution of the instruction by the processor causes the processor to transmit a signal to the direct memory access module, said signal causing the direct memory module to load the code memory with the another portion of the program and transmit another signal to the processor after loading the code memory with the another portion, and cessation of program execution by the processor until the processor receives the another signal from the direct memory access module.

2. The integrated circuit of claim 1, said integrated circuit further comprising:
   a display engine for preparing the decompressed video data for display; and
   wherein the host processor controls the display engine and wherein the program is also for controlling the display engine.

* * * * *